July 19, 1938.  E. H. LAND  2,123,902.
LIGHT POLARIZING MATERIAL
Filed June 2, 1936
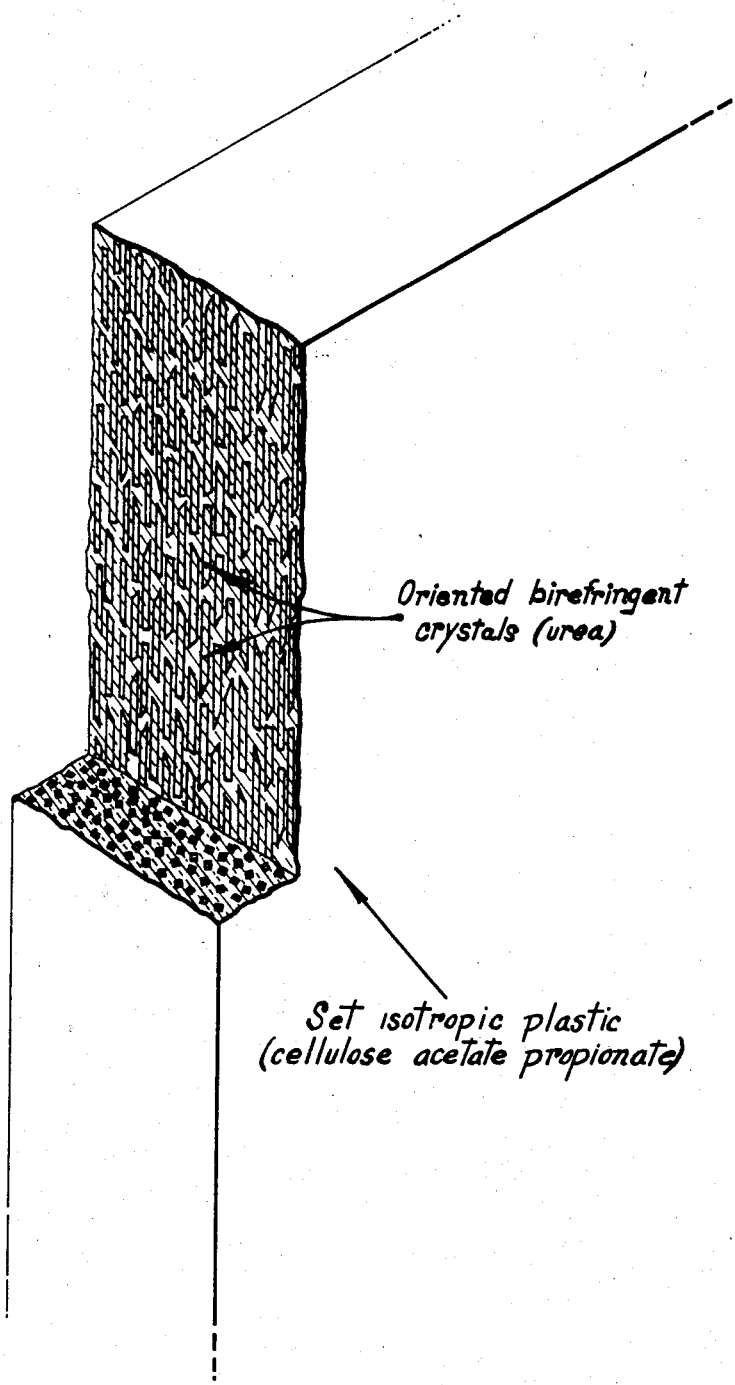

Patented July 19, 1938

2,123,902

UNITED STATES PATENT OFFICE 2,123,902

LIGHT POLARIZING MATERIAL

Edwin H. Land, Wellesley Farms, Mass., assignor to Sheet Polarizer Company, Inc., Union City, N. J., a corporation of New Jersey Application June 2, 1936, Serial No. 83,040

26 Claims. (Cl. 88—1)

This invention relates to a new and improved light-polarizing material.

An object of the invention is to provide a suspension of crystalline, birefringent, needle-like particles with their needle axes oriented in substantial parallelism in a substantially isotropic suspending medium having an index of refraction equal substantially to one of the indices of the oriented crystalline particles.

Still further objects are to provide a suspension of minute particles of urea in a suspending medium, to provide such a suspension wherein the suspending medium may comprise a set plastic; to provide such a suspension wherein the suspending medium may comprise a set plastic and plasticizing material; to provide such a suspension wherein the suspending medium may have an index of refraction equal substantially to one of the indices of urea; to provide such a suspension wherein the suspending medium may be produced in sheet-like form and wherein the orientation of the crystalline particles of urea may be effected in connection with the formation of such sheet-like form.

A still further object of the invention is to provide such a product wherein the suspending medium may be adapted to protect the suspended crystals of urea from solution in water.

A still further object of the invention is to provide such a product wherein the suspension of urea is effected in a cellulosic material, such for example as cellulose acetate or cellulose acetate propionate, or cellulose acetate butyrate, or ethyl cellulose.

A still further object of the invention is to provide such a product wherein the urea particles may be suspended in a synthetic resin such as a plasticized polymerized vinyl compound, such for example as Vinylite.

Other objects of the invention will in part be obvious and will in part appear hereinafter.

The invention accordingly comprises the article possessing the features, properties, and the relation of elements, which are exemplified in the following detailed disclosure, and the scope of the application of which will be indicated in the claims.

For a fuller understanding of the nature and objects of the invention, reference should be had to the accompanying drawing, which represents somewhat diagrammatically in cross-section and greatly enlarged for the sake of clarity, a view of a device embodying one form of the invention.

This application is a continuation in part of my copending application Serial No. 72,501, filed April 3, 1936. In my said copending application there is described a product comprising a suspension of oriented, birefringent, uniaxial or biaxial crystalline particles in a substantially isotropic suspending medium having an index of refraction equal substantially to one of the indices of the oriented crystalline particles. Such a product transmits light as two separable beams, one a substantially specular, none-diffused polarized beam and the other as a spread or diffused and differently polarized beam. Such a product is especially useful in connection with systems of automobile headlight glare elimination.

This invention contemplates the provision of a cheap, durable, readily manufactured product of the type more generally described in my said copending application, and more specifically this invention contemplates the provision of such a product comprising a suspension of needle-like crystals of urea in any suitable suspending medium, the needle axes of the urea crystals being oriented to substantial parallelism, and the index of refraction of the suspending medium coinciding approximately with one of the indices of refraction of urea, preferably with the lower or ordinary index.

In one form of the invention a solution of urea in methanol in the proportions of, for example, 25 grams of urea in 70 c. c. of methanol, is formed at a temperature of approximately 120° F., and this solution is added to a solution of cellulose acetate propionate in ethyl acetate in the proportions, for example, of one pound of cellulose acetate propionate to 600 c. c. of ethyl acetate, 320 c. c. of dimethyl-phthalate being added to this mixture, and the mixing continued at a temperature of approximately 120° F. until a clear, transparent, homogeneous mass has been secured. In this condition the crystals of urea are dissolved in the solvent. The mass is then cooled to about room temperature, for example, by the application of cold water to the jacket of the mixer, and in the presence of cooling, minute, needle-like particles of urea are precipitated out within the mass, which gradually takes on a cloudy, milky appearance. The cooled mass may then be placed in a suitable filter, filtered and placed in an extrusion press and extruded in the form of sheets, the extrusion acting simultaneously to orient the precipitated needle-like crystals of urea with their needle axes in substantial parallelism. Since the basal section of the urea crystals is square, no further orientation beyond the orientation of the needle axes of the crystals occurs.

Upon evaporation of the solvent the extruded sheet assumes properties such that there is no tendency for the urea to go back into solution, even though the sheet be subjected to such temperatures as may ordinarily be employed in associating it in close proximity to the light source in a head-lamp or similar device.

The addition to the mix of the dimethyl-phthalate or other plasticizer acts with the cellulose acetate propionate to give an index of refraction to the dried suspending medium which is approximately equal to the ordinary or lower index of urea, i. e., 1.484.

While extrusion has been described as the method of orienting the needle-like particles, it is to be understood that any of the other methods of orienting may be employed, such for example as rolling, stretching, smearing or the like.

While cellulose acetate propionate has been described as the suitable suspending medium, it is to be understood that other media may be employed, for example cellulose acetate or cellulose acetate butyrate, or vinyl acetate, or the conjoint polymer of vinyl acetate and vinyl chloride, sold as "Vinylite", or ethyl cellulose. When some of these materials are employed it may be found desirable to use other solvents than ethyl acetate or other plasticizers than dibutyl-phthalate or dimethyl-phthalate. For example, dibutyl-phthalate is not a suitable plasticizer for cellulose acetate, but dimethyl-phthalate is.

A modification of the process of this invention may comprise the introduction into a solution of cellulosic material, such for example as cellulose acetate propionate, of the urea crystals in crystalline form. When this modification of the process is employed, the cellulose acetate propionate is dissolved in ethyl acetate in the manner previously mentioned. A small amount of methanol may be added to the ethyl acetate at the time of solution, if desired. It is also convenient to add the plasticizer, for example dimethyl-phthalate, initially. The mixture of cellulose acetate propionate, the solvents and the plasticizer may be heated to a temperature of around 120° F., and the desired quantity of urea crystals directly introduced thereinto. Mixing should continue until the crystals have been dissolved and uniformly distributed throughout the mass. The process may then be continued in the manner outlined above.

Where cellulose acetate is employed as the plastic suspending medium, it is desirable to add an excess of urea crystals or an excess of solution of urea in methanol in order to accelerate precipitation of the minute, needle-like crystals of urea in the mass upon cooling.

Where cellulose acetate butyrate is employed as the suspending medium, the process may follow substantially the steps previously described.

Where ethyl cellulose which has a birefringence of about .01 and which may be considered as optically anisotropic is employed as the suspending medium, the process may, if desired, be carried out in the manner previously described, or because of the solubility of ethyl cellulose in methanol a modified process may be employed. Enough ethyl cellulose may be added to the solution of urea in methanol to form a paste which may be somewhat more readily mixed with the remaining solution of ethyl cellulose in, for example, ethyl acetate.

Where vinyl acetate is employed as the suspending medium, the process may follow the steps outlined in connection with the use of cellulose acetate propionate as the suspending medium.

Where the conjoint polymer of vinyl chloride and vinyl acetate is employed as the suspending medium, a minimum amount of methanol should be employed, and best results are obtained where no methanol is used and where dry urea crystals are directly introduced into the heated solution of the polymer in the solvent employed, which may be, for example, acetone or ethyl acetate.

Wherever solvents have been mentioned it is to be understood that the solvent specified is not the only one which may be used, the only requirement being that the urea be sufficiently soluble in the heated solvent to give an adequate precipitation of crystalline needle-like particles upon cooling. Preferably the precipitation upon cooling should be so complete that further precipitation as the sheeted material dries is negligible optically.

While the process has been described as employing in one form heated solutions of the materials used, it is to be understood that the process may be employed without the addition of heat. For example, a saturated solution of urea in methanol at room temperature may be employed and may be introduced into the mixture of the plastic, the solvent and the plasticizer at room temperature. In this modification of the process the solvent for the plastic should have so low a solubility for urea at room temperatures as to cause the precipitation of the urea that was dissolved in the methanol upon mixing. When the materials are mixed in this manner care should be taken to avoid the evaporation of the methanol on the surface of the mix before adequate mixing has been accomplished.

While urea has been mentioned as the crystalline compound employed, it will be obvious that other suitable birefringent crystalline materials may be used with suitable solvents and suspending media without departing from the scope of the invention.

If the sheet-like material is formed by extrusion, a suitable process may employ V-shaped jaws having an aperture of about .012 inch and the material may be extruded therefrom under a pressure of say about 25 pounds per square inch. It will be obvious that these dimensions and pressures are by no means critical, and that they may be modified to obtain sheets of varying thicknesses and to obtain the speed of extrusion desired.

The sheet-like material of the present invention functions to polarize a transmitted beam of light in the following manner:

The incident beam is resolved into two components, for one of which the sheet is substantially like a sheet of glass. This is the component vibrating in a plane such that the index of the suspending medium and the index of the suspended crystalline particles for vibrations in that plane are identical. This component will be transmitted as a beam of specular or non-diffused light, and will be polarized. The other component, i. e., the component vibrating in a direction for which the index of the suspending medium differs from the index of the suspended crystalline material, will be transmitted as a spread or diffused beam, differently polarized. Inasmuch as the suspended crystals may preferably be needle-shaped with their needle axes oriented, this spread or diffused beam will be spread or diffused in a band, assuming that a parallel or collimated beam is impinging upon the sheet, lying in the plane of the specularly transmitted beam and of substantially the same height as that beam. For the purposes of this invention this type of spreading or diffusion will be termed cylindrical scattering, wherein the direction of orientation of the crystals in the material is parallel to the axis of the cylinder, and the scatter is along radii normal to this axis.

The sheet-like material of the present invention is flexible. It may be rolled or bent or formed. When a plasticizer not miscible with water, such as dibutyl-phthalate, is employed, the sheet-like material is substantially waterproof, even though urea crystals are themselves very soluble in water.

The product of the present invention may be adapted to polarize the extremes of the spectrum and may even be adapted to polarize the ultra violet and infra red, where the crystals employed are of sufficiently great diameter, i. e., larger in diameter than the wave length of the radiation polarized. It is to be noted that the product of the present invention polarizes by transmitting one component and by scattering the other. Hence, even though it be employed as a polarizer for the infra red, it does not heat up through polarization of those rays.

The product of the present invention is colorless and imparts no color characteristic to the transmitted polarized beam. For the specularly transmitted component the product of this invention is absolutely colorless and water-white. Furthermore, the light lost through absorption in the crystalline material is negligible, since for example in a sheet .010 inch in thickness the total thickness of the crystalline material traversed by any ray of the specularly transmitted beam may not exceed .0005 inch. Modern plastics are so clear and water-white that the light lost through absorption therein is negligible. It follows therefore that the product of the present invention transmits the specular or non-diffused component with a very high efficiency and with negligible loss through absorption.

It will be understood that the product of the present invention may, if desired, be laminated, as for example between sheets of glass or other light-transmitting protective media. In the process of laminating care should be taken to avoid the use of temperatures so high that the crystals tend to dissolve in the suspending medium. Where no plasticizer is used in the suspending medium, higher temperatures may be employed and the finished product may be subjected in use to higher temperatures than where plasticizer is present. Where the finished product is to be subjected to high temperatures, the sheeting should preferably contain no plasticizer and the lamination should be effected by means of a cement or bonding material containing a plasticizer which is a non-solvent for the sheeting. For example, the sheeting material might embody a distribution of crystals of urea in cellulose acetate without the use of a plasticizer, and the lamination might be effected by employing as the bonding material or cement vinyl acetate plasticized with dibutyl-phthalate.

Speaking generally, the two methods previously discussed, i. e., the so-called cold method and the method of forming the product by means of a process employing heat, provide means for controlling the crystal size of the suspended particles. The so-called cold process gives a larger crystal size than does the process employing heat, and where a large crystal is desired the cold process is preferred.

So also alteration in the selection of the suspending medium may cause alteration in the crystal size in the product of the present invention. For example, cellulose acetate propionate as a suspending medium will tend to give a somewhat larger crystal than cellulose acetate, and cellulose acetate butyrate when employed will tend to result in the formation of still larger crystals.

So also the selection of the solvent may result in alteration of the crystal size and shape. For example, crystals formed with ethyl cellulose and acetone as the plastic and solvent tend to be very long and thin with respect to crystals formed, for example, with cellulose acetate butyrate and ethyl acetate.

It will be understood that a preferred condition will be one wherein the index of refraction for the suspending medium exactly matches the desired index of refraction of the suspended crystalline particles for all wave lengths utilized. If this condition cannot be effected with the suspending medium and crystalline material employed, the index of refraction of the suspending medium should preferably be controlled to exactly match the index of the suspended particles for that wave length in the center of the band of wave lengths which it is desired to use.

It will be obvious that the index of the suspending medium may be controlled within reasonable limits by varying slightly the proportions of plastic and plasticizer and by a proper selection of the plastic and plasticizer employed. It will also be obvious that various plastics and plasticizers may be blended to give different indices and different wave length dispersions in order that the desired result may be most closely approximated.

While reference has heretofore been made to the use of a suitable suspending medium or matrix having an index of refraction coinciding with the lower index of urea, it is to be understood that the invention contemplates the use of a suspending medium having an index of refraction matching the upper index of the suspended particles. For example, where urea is employed as the suspended crystalline material, the index of refraction of the matrix should approximate 1.606. Wherry gives the upper index of urea as 1.602, and Bolland gives the upper index as 1.61.

A suitable suspending medium or matrix may comprise, for example, benzyl cellulose, which may be considered as substantially isotropic, having indices of $e$ 1.567 and $o$ 1.57. This material may be mixed with enough of the material sold under the trade-name "Aroclor," a chlorinated diphenyl, to give the desired index. The mixture may be accomplished by dissolving in benzene, and the urea may be added to the mixture in the manner previously indicated.

For a further consideration of this problem reference is again made to my copending application Serial No. 72,501, wherein a discussion of the desirability of matching one or the other index is to be found.

In the specification and claims the term "isotropic" shall be deemed to include media which are actually slightly birefringent, but in which the indices of refraction are both so close in value to one of the indices of the crystals, as compared with the large difference between the two indices of the crystals, that the birefringence of the sheet does not materially alter the differential scattering of the ordinary and extraordinary components.

It should be noted furthermore that the process of orienting the optic axes of the suspended crystalline material, as for example by extrusion, smearing, and the like, will simultaneously so orient the axes of birefringence of the matrix that it will not resolve the transmitted beam into additional components.

Since certain changes and modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A light-polarizer comprising a suspension of optically oriented, birefringent particles in a light-transmitting medium having an index of refraction coinciding substantially with the index of refraction of said particles for light vibrating in a predetermined direction, and having an index of refraction for light vibrating in another direction differing substantially from the index of refraction of the particles for light vibrating in said other direction.

2. A light-polarizer comprising a suspension of optically oriented, birefringent particles in a substantially isotropic light-transmitting medium having an index of refraction coinciding substantially with one of the indices of refraction of said particles.

3. A light-polarizer comprising a suspension of optically oriented, birefringent particles in a light-transmitting medium having an index of refraction coinciding substantially with the index of refraction of said particles for light vibrating in a predetermined direction, and having an index of refraction for light vibrating in another direction differing substantially from the index of refraction of the particles for light vibrating in said other direction, substantially every one of said particles being completely surrounded by said medium.

4. A light-polarizer comprising a suspension of optically oriented, birefringent particles in a light-transmitting medium having an index of refraction coinciding substantially with the index of refraction of said particles for the ordinary ray, said medium having an index of refraction for light vibrating in a direction other than the direction of vibration of the ordinary ray differing substantially from the index of refraction of said particles for light vibrating in said other direction.

5. A light-polarizer comprising a suspension of optically oriented, birefringent particles in a substantially isotropic light-transmitting medium having an index of refraction coinciding substantially with the lower index of refraction of said particles.

6. A light-polarizer comprising a suspension of optically oriented, birefringent particles in a substantially isotropic light-transmitting medium having an index of refraction coinciding substantially with the upper index of refraction of said particles.

7. A light-polarizer comprising a suspension of optically oriented, optically uniaxial, birefringent particles in a light-transmitting medium having an index of refraction coinciding substantially with the index of refraction of said particles for light vibrating in a predetermined direction and having an index of refraction for light vibrating in another direction differing substantially from the index of refraction of said particles for light vibrating in said other direction.

8. In combination, optically oriented, birefringent particles in a light-transmitting matrix having an index of refraction for light vibrating in a predetermined direction coinciding substantially with the index of refraction of said particles for light vibrating in said direction, said matrix completely surrounding substantially every particle individually, said combination being adapted to transmit substantially without diffusion rays vibrating in that direction for which the particle index coincides with the said matrix index, and adapted to transmit with greater diffusion rays vibrating perpendicularly to said first-mentioned rays.

9. In combination, optically oriented, birefringent particles in a light-transmitting set plastic matrix having an index of refraction for light vibrating in a predetermined direction coinciding substantially with the index of refraction of said particles for light vibrating in said direction, said matrix completely surrounding substantially every particle individually, said combination being adapted to transmit substantially without diffusion rays vibrating in that direction for which the particle index coincides with the said matrix index and adapted to transmit with greater diffusion rays vibrating perpendicularly to said first-mentioned rays.

10. A light-polarizer comprising a suspension of optically oriented, birefringent particles in a light-transmitting, cellulosic medium having an index of refraction coinciding substantially with the index of refraction of said particles for light vibrating in a predetermined direction and having an index of refraction for light vibrating in another direction differing substantially from the index of refraction of said particles for light vibrating in said other direction.

11. A light-polarizer comprising a suspension of optically oriented, birefringent particles in a light-transmitting medium comprising ethyl cellulose and having an index of refraction coinciding substantially with the index of refraction of said particles for light vibrating in a predetermined direction, the index of refraction of said particles for light vibrating in another direction differing substantially from the index of refraction of ethyl cellulose for light vibrating in said other direction.

12. A light-polarizer comprising a suspension of optically oriented, birefringent particles in a substantially isotropic light-transmitting medium comprising cellulose acetate propionate and having an index of refraction coinciding substantially with one of the indices of refraction of said particles.

13. A light-polarizer comprising a suspension of optically oriented, birefringent particles in a substantially isotropic light-transmitting medium comprising a synthetic resin and having an index of refraction coinciding substantially with one of the indices of refraction of said particles.

14. A light-polarizer comprising a suspension of optically oriented, birefringent particles in a substantially isotropic light-transmitting medium comprising a vinyl compound and having an index of refraction coinciding substantially with one of the indices of refraction of said particles.

15. A light-polarizer comprising a suspension of optically oriented, birefringent particles in a light-transmitting medium comprising a mixture of plastics, the proportion of each such plastic in said medium being such that said medium has an index of refraction coinciding substantially with the index of refraction of said particles for light vibrating in a predetermined direction, and having an index of refraction for light vibrating in another direction differing substantially from the index of refraction of said particles for light vibrating in said other direction.

16. A light-polarizer comprising particles of urea in a light-transmitting medium having an index of refraction for light vibrating in a predetermined direction coinciding substantially with the index of refraction of urea for light vibrating in said direction, the particles of urea being oriented with their optic axes in parallel, the medium having an index of refraction differing substantially from the index of refraction of urea for light vibrating in a different direction.

17. A light-polarizer comprising particles of urea in a substantially isotropic light-transmitting medium having an index of refraction of approximately 1.484, the particles of urea being oriented with their optic axes in parallel.

18. A light-polarizer comprising particles of urea in a substantially isotropic light-transmitting medium having an index of refraction of approximately 1.606, the particles of urea being oriented with their optic axes in parallel.

19. A light-polarizer comprising particles of urea in a light-transmitting, cellulosic medium having an index of refraction coinciding substantially with the index of refraction of urea for light vibrating in a predetermined direction, and having an index of refraction differing substantially from the index of refraction of urea for light vibrating in another direction, the particles of urea being oriented with their optic axes in parallel.

20. A light-polarizer comprising particles of urea in a substantially isotropic light-transmitting medium comprising a synthetic resin and having an index of refraction coinciding substantially with one of the indices of refraction of urea, the particles of urea being oriented with their optic axes in parallel.

21. A light-polarizer comprising particles of urea in a substantially isotropic light-transmitting medium comprising a vinyl compound and having an index of refraction coinciding substantially with one of the indices of refraction of urea, the particles of urea being oriented with their optic axes in parallel.

22. A light-polarizer comprising particles of urea in a light-transmitting medium substantially impervious to water and having an index of refraction coinciding substantially with the index of refraction of urea for light vibrating in a predetermined direction, and having an index of refraction differing substantially from the index of refraction of urea for light vibrating in a different direction, the particles of urea being oriented with their optic axes in parallel.

23. A light-polarizer comprising particles of urea in a light-transmitting medium, the said particles being oriented with their optic axes in parallel, the polarizer being substantially optically clear to light vibrating in a predetermined manner, and substantially optically turbid to differently vibrating light of the same wave length.

24. A polarizer for the ultra-violet comprising, in combination, optically oriented, birefringent particles distributed throughout a matrix, said matrix and said particles both being transparent in the ultra-violet, an index of refraction of said matrix for wave lengths within the ultra-violet vibrating in a predetermined direction coinciding substantially with the index of refraction of said particles for said vibrations within the ultra-violet, said matrix having an index of refraction for wave lengths within the ultra-violet vibrating in a different direction differing substantially from the index of refraction of said particles for said vibrations.

25. A polarizer for the infra-red comprising, in combination, optically oriented, birefringent particles distributed throughout a matrix, said matrix and said particles both being transparent in the infra-red, an index of refraction of said matrix for wave lengths within the infra-red vibrating in a predetermined direction coinciding substantially with the index of refraction of said particles for said wave-lengths within the infra-red, said matrix having an index of refraction for wave-lengths within the infra-red vibrating in a different direction differing substantially from the index of refraction of said particles for said vibrations.

26. A light-polarizer comprising a light-transmitting matrix having distributed therethrough a multiplicity of rodlike, birefringent particles oriented with their direction of elongation in substantial parallelism, and the index of refraction of the matrix for light vibrating in a predetermined direction coinciding substantially with the index of refraction of said particles for light vibrating in said direction, and the index of refraction of the matrix for light vibrating in another direction differing substantially from the index of refraction of said particles for light vibrating in said other direction, whereby said polarizer is adapted to so resolve each incident ray into two components as to transmit a beam which is substantially non-diffused and a beam which is substantially cylindrically spread.

EDWIN H. LAND.